C. ANDERSON.
Improvement in Steam-Pressure Gauges.
No. 128,452.   Patented July 2, 1872.
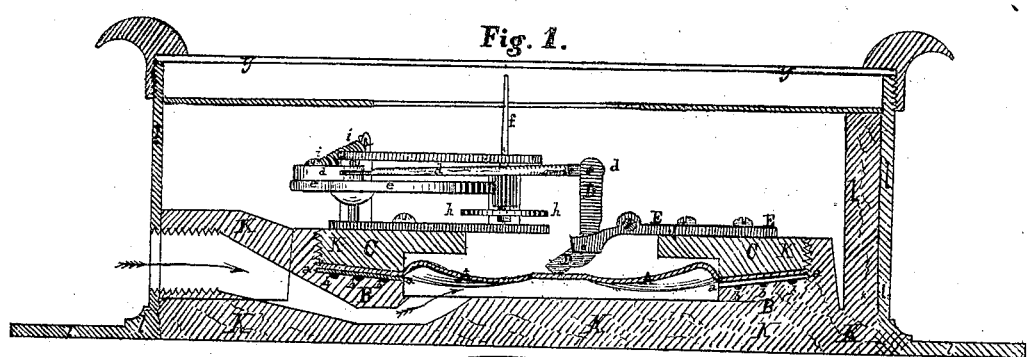
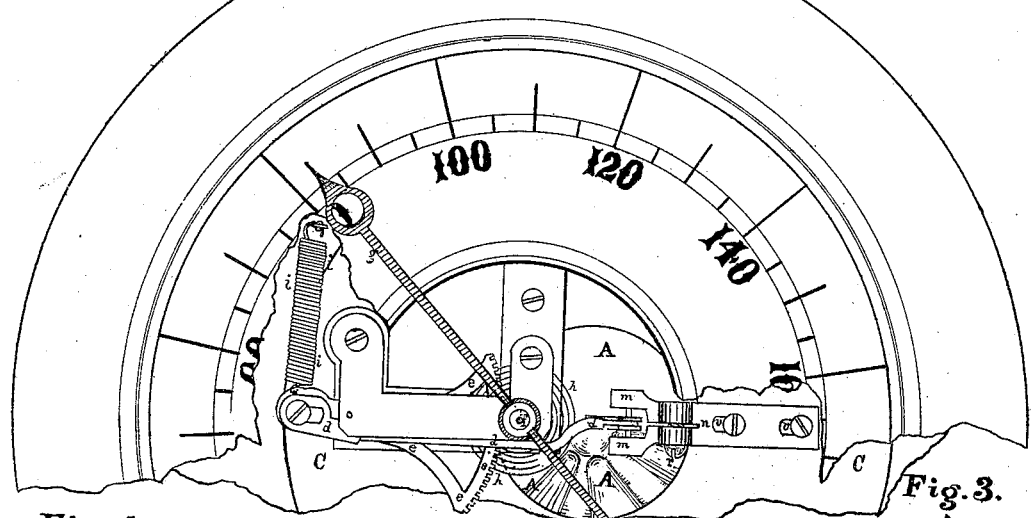
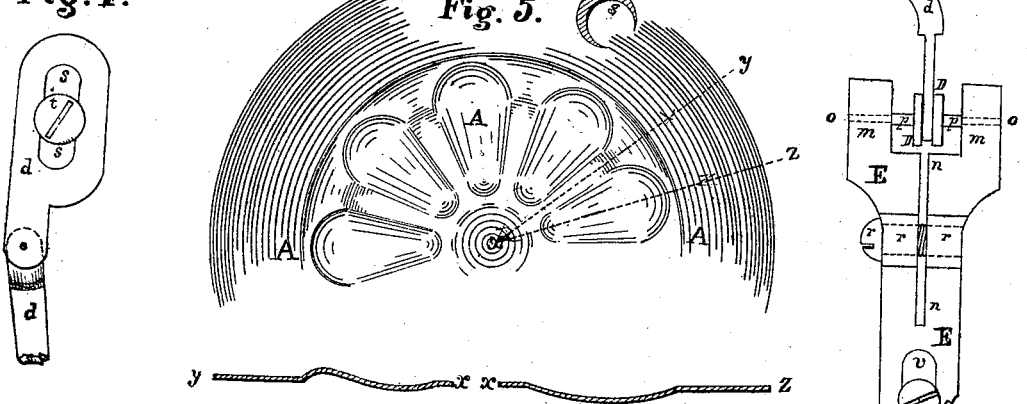
Witnesses.
Inventor.
Charles Anderson
By Wells M. Leggett
Attorney.

2 Sheets--Sheet 2.
C. ANDERSON.
Improvement in Steam-Pressure Gauges.
No. 128,452.            Patented July 2, 1872.
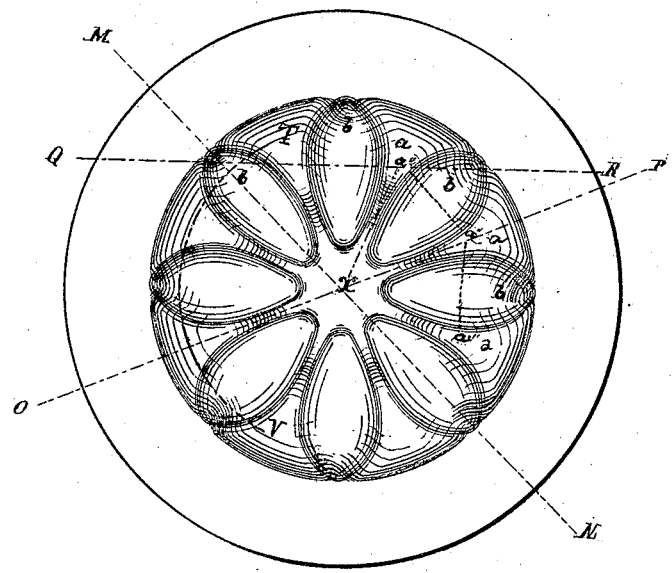
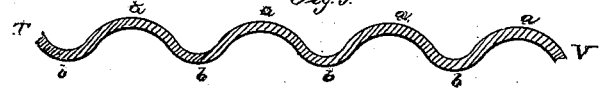
WITNESSES:           INVENTOR:

128,452

UNITED STATES PATENT OFFICE.

CHARLES ANDERSON, OF CINCINNATI, OHIO, ASSIGNOR TO POST & CO., OF SAME PLACE.

IMPROVEMENT IN STEAM-PRESSURE GAUGES.

Specification forming part of Letters Patent No. 128,452, dated July 2, 1872.

SPECIFICATION.

Be it known that I, CHARLES ANDERSON, of the city of Cincinnati, county of Hamilton, State of Ohio, have invented a new and Improved Steam-Pressure Gauge; and I hereby declare the following to be a full, clear, and exact description of the same, such as will enable others skilled in the art to which it pertains to make and use it, reference being had to the accompanying drawing which forms a part of this specification.

My invention relates to improvements in the pressure-elbow; in the attachment of the transmitting-bar to the segment-lever; in the steam-joint about the diaphragm; in the diaphragm itself.

In the drawing, Figure 1 is a sectional view, showing parts of the instrument in elevation, in which A is the diaphragm resting on an inclined bearing, B, with annular grooves $b\ b$. $a\ a$ is a ring of soft metal, which rests upon the bearing B. C is a follower provided with a counter-incline. D is the pressure-elbow. $d\ d$ is the transmitting-bar. $e\ e$ is the segment-lever; $f$, the spindle that carries the pointer $g$. $h$ is a spiral spring to return the pointer to the origin, when the gauge is relieved from pressure. It is assisted by the spirally-coiled spring $i\ i$, seen in Fig. 2. K K in the casing is iron, and $l\ l$ is brass. $y\ y$ is a glass face.

Fig. 2 is plan of the gauge, in which similar letters represent similar parts.

Fig. 3 is separate enlarged view of pressure-elbow D, in which $n$ is the slot between the parts $m\ m$ that inclose the pivot $p$. $r$ is a set-screw. $v\ v$ are elongated screw-holes.

Fig. 4 is an enlarged view of the transmitting-bar $d\ d$, showing the slot $s$ and screw $t$ for gauging the length of the bar $d\ d$.

Fig. 5 is plan of the diaphragm A, showing its peculiar corrugations, the inclined rim appearing in section in Fig. 1.

Fig. 6, Sheet 2, represents the corrugations on the steam-diaphragm, in which $a\ a\ a$ are the abrupt upward indentations, and $b\ b\ b$ the depressed indentations.

Fig. 7 is sectional drawing, showing parts in elevation along M N.

Fig. 8, similar section along O P.

Fig. 9, developed sectional line along T V.

Fig. 10, sectional line along Q R.

My invention consists as follows: Heretofore great trouble has been experienced by the diaphragm yielding somewhat at the joint by slightly drawing out, so that at different times, under the same pressure, the gauge would indicate different readings. I overcome this difficulty by making the surfaces of the joint to incline upward, so that when the follower C is screwed down upon the diaphragm and the steam impinges upon its lower surface it will tighten the metal within the joint, instead of permitting it to yield, and will at the same time lessen the possibility of any leak of the steam, I insert a ring, $a\ a$, of soft metal between the seat B and follower C, so that when the follower is forced down upon it it will be pressed more or less into the annular grooves $b\ b$, which are made in the seat B, thus making a perfectly tight steam-joint. I make pivot-seats in the two arms $m\ m$ of the elbow-carrier piece, but instead of setting the pivot as heretofore, by means of two screws, which bear the pivot-seats in their ends, I simply make a narrow slot, $n$, back between the arms $m\ m$, which are capable of being spread or drawn together by means of the set-screw $r$, and the pivot $p$ can, therefore, be brought to a very sensitive but firm setting with very little trouble.

In the old method, by the successive effects of heat and cold, the set-screws were liable to become so loose at times as to cause the elbow to be shackly, and at other times, under the influence of high heat, would bind and not permit the indicator to register a lower pressure.

A steam-gauge must either be reliable or unreliable. Engineers and the public—the safety of whose lives and property are at the mercy of a steam-pressure indicator—will recognize no degrees of reliability.

In order to adjust the elbow to the center of the diaphragm, I propose to elongate the screw-holes $v\ v$ in its carrier-piece, Fig. 3, and by a similar elongation of the screw-hole $s$ at the point of attachment of the transmitting-bar $d\ d$ the elbow can be raised or lowered slightly, and thereby nicely adjusted so as just to touch the diaphragm when relieved from pressure, and is retained in this position by the set-screw $t$ in Fig. 4. I form the diaphragm A with the corrugations shown in the drawing, and with its rim, which rests on the bearing B, slightly inclined upward to correspond with the shape of the steam-joint.

Heretofore all diaphragms have been so formed near the steam-joint that they would yield more easily under a great pressure than under a light one, and under great pressures often become so distorted as to break along this line, or bent so as not to resume the primitive state when relieved.

To overcome this difficulty I have so formed the diaphragm with abrupt elevations $a\ a\ a$ next to the rim, between the successive depressions $b\ b\ b$, (which latter extend clear to the rim,) that a sectional line, T V, shown in development in Fig. 9, will be an abruptly-waved line. If a great pressure be brought upon $x$ from beneath, the parts between $x$ and $a''$ will yield more easily, because of the abrupt surfaces about $a''$; but in order that the surfaces about $x$ may yield at all, the depressions $b\ b$ must enlarge or become broader along their lines of least resistance $a''\ a''$. The parts $a''\ a''\ a''$ will then become more abrupt by having their sides pressed together, and will, as the pressure is increased, assume a shape offering greater resistance, or will approach the U-beam in cross-section. The effect of this is to decrease, virtually, the lever-arm of the pressure as the pressure increases, and therefore to cause the center $x$, and consequently the pointer, to pass through equal spaces for equal increases in the pressure under all degrees of strain. The peculiar shape given to the corrugations gives to the diaphragms that form best adapted to yield proportionately under all degrees of pressure. I make the case with an iron back, K K, cast into brass sides $l\ l$, or sides of other metal. I use iron for the back because its expansion and contraction is less than that of other metals.

Having thus described my invention, what I claim as new, and desire to secure by Letters Patent, is—

1. The diaphragm A, with the egg-shaped depressions $b\ b\ b$ and abrupt elevations $a\ a\ a$, and provided with either a flat or inclined rim or bearing, all constructed, arranged, and operating in the manner and for the purposes substantially as set forth and shown.

2. The inclined steam-joint, composed of inclined bearing B, inclined follower C, and soft metal ring $a\ a$, all constructed as and for the purposes substantially as shown and described.

3. The combination of the lever attachment E E provided with slot and set-screw $n\ r$ and slots $v\ v$, the lever D, and the transmitting-bar $d\ d$ provided with slot and set-screw $s\ t$, constructed and operating substantially as and for the purposes described.

4. The elbow-attachment block E E, provided with slot $n\ n$, set-screw $r$, slots $v\ v$, and pivot-holes $o\ o$, as and for the purposes set forth and shown.

CHARLES ANDERSON.

Witnesses:
E. P. BRADSTREET,
J. CORT GETZENDANNER.